Figure 1:
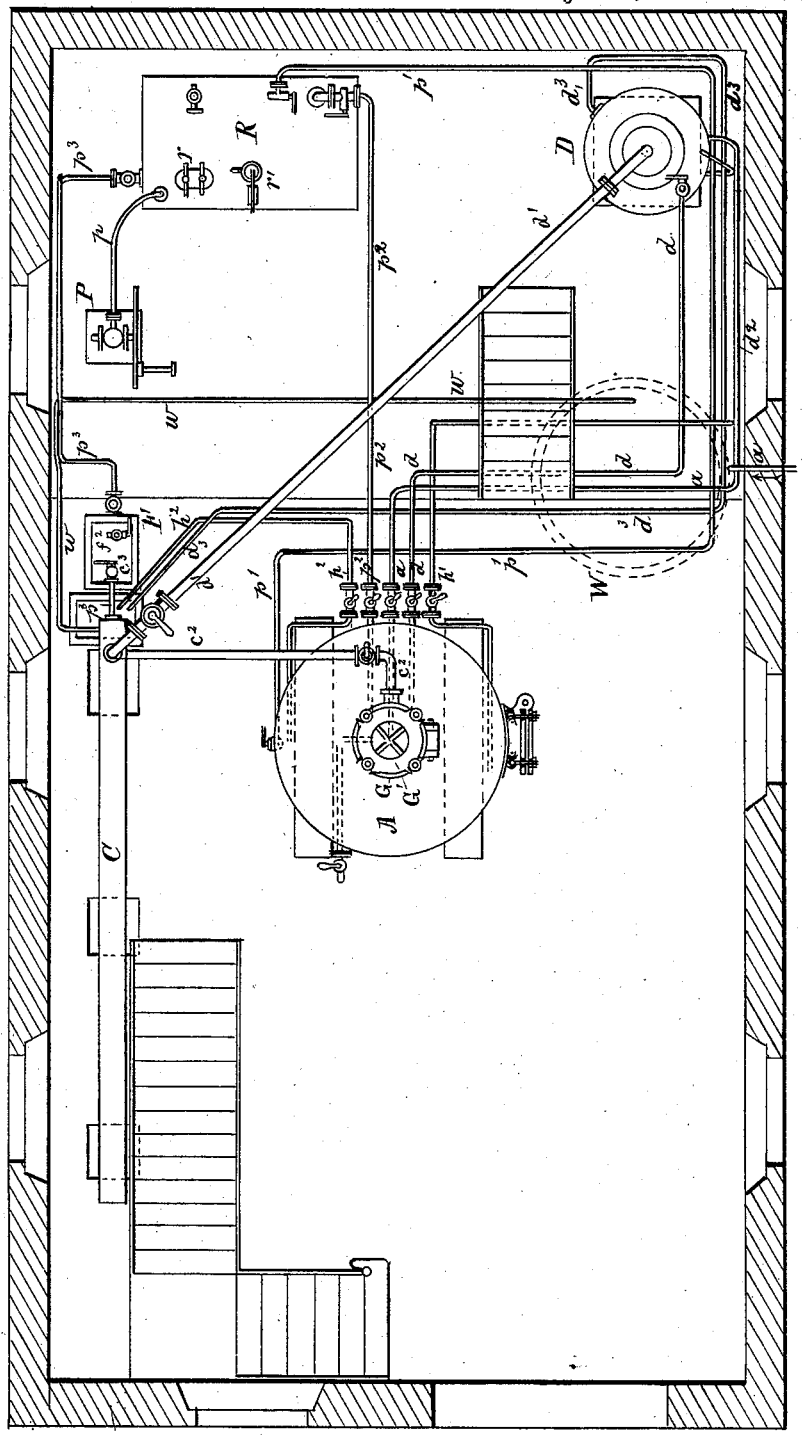

(No Model.) 7 Sheets—Sheet 1.
F. SELTSAM.
METHOD OF AND APPARATUS FOR SEPARATING AND RECOVERING THE FATTY MATTERS FROM BONES.
No. 261,634. Patented July 25, 1882.

Witnesses
H. A. Daniels
Wm. A. McElwee.

Inventor
Friedrich Seltsam
pr Henry Orth
atty (No Model.) 7 Sheets—Sheet 2.
F. SELTSAM.
METHOD OF AND APPARATUS FOR SEPARATING AND RECOVERING THE FATTY MATTERS FROM BONES.
No. 261,634. Patented July 25, 1882.
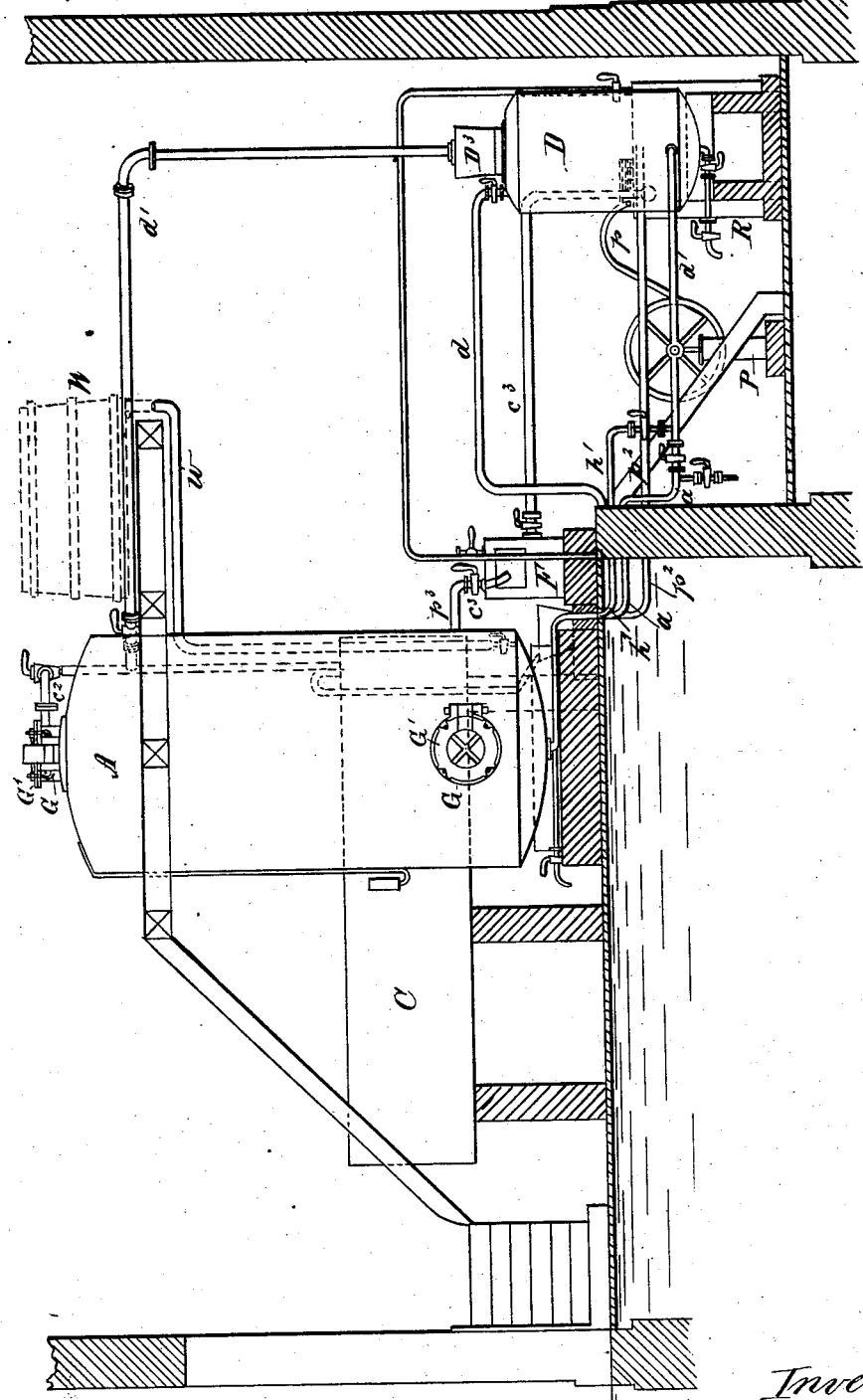
Witnesses
H. A. Daniels
Wm. A. McElwee
Inventor
Friedrich Seltsam
fr Henry Orth
att'y

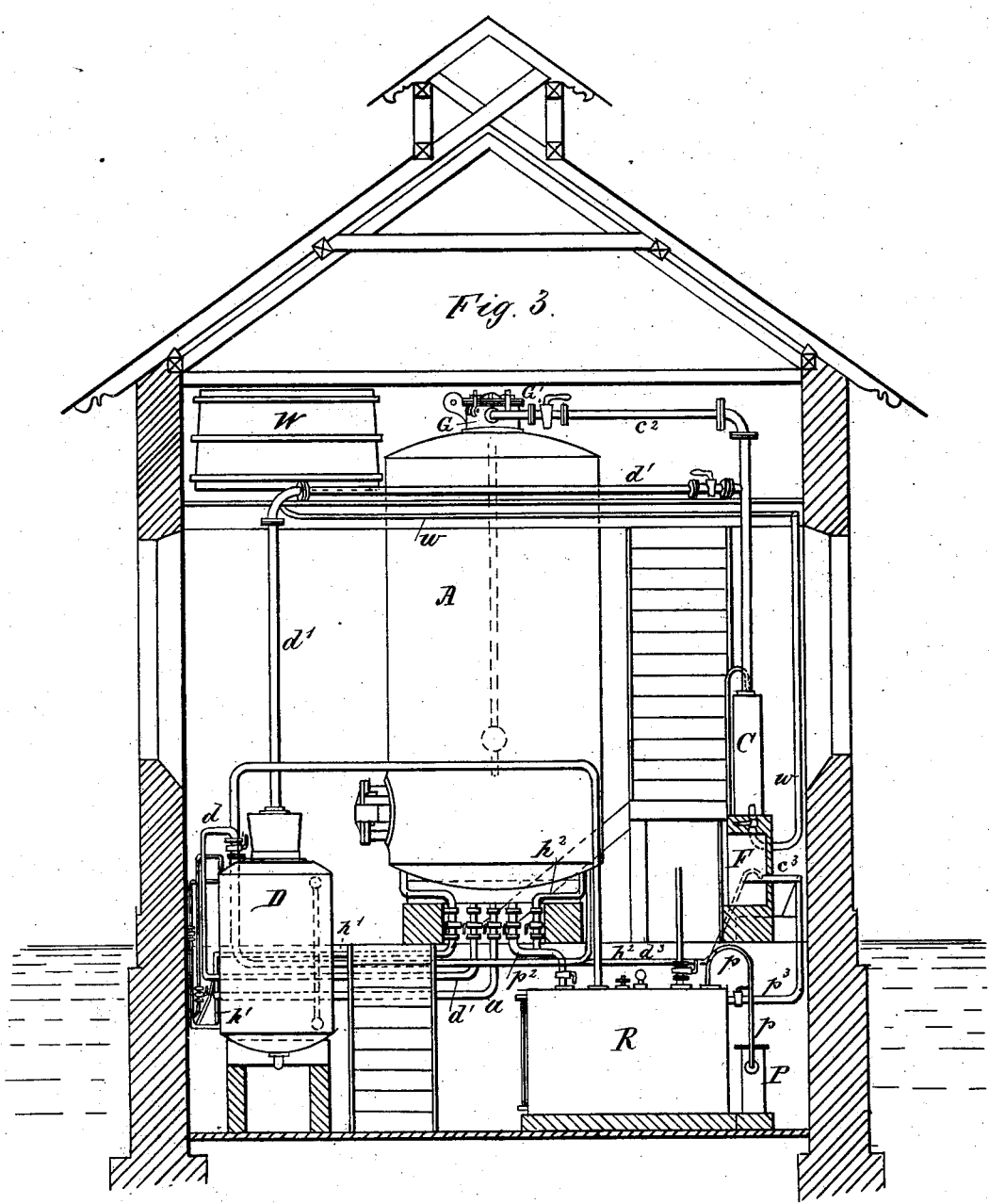

(No Model.) 7 Sheets—Sheet 4.
F. SELTSAM.
METHOD OF AND APPARATUS FOR SEPARATING AND RECOVERING THE FATTY MATTERS FROM BONES.
No. 261,634. Patented July 25, 1882.
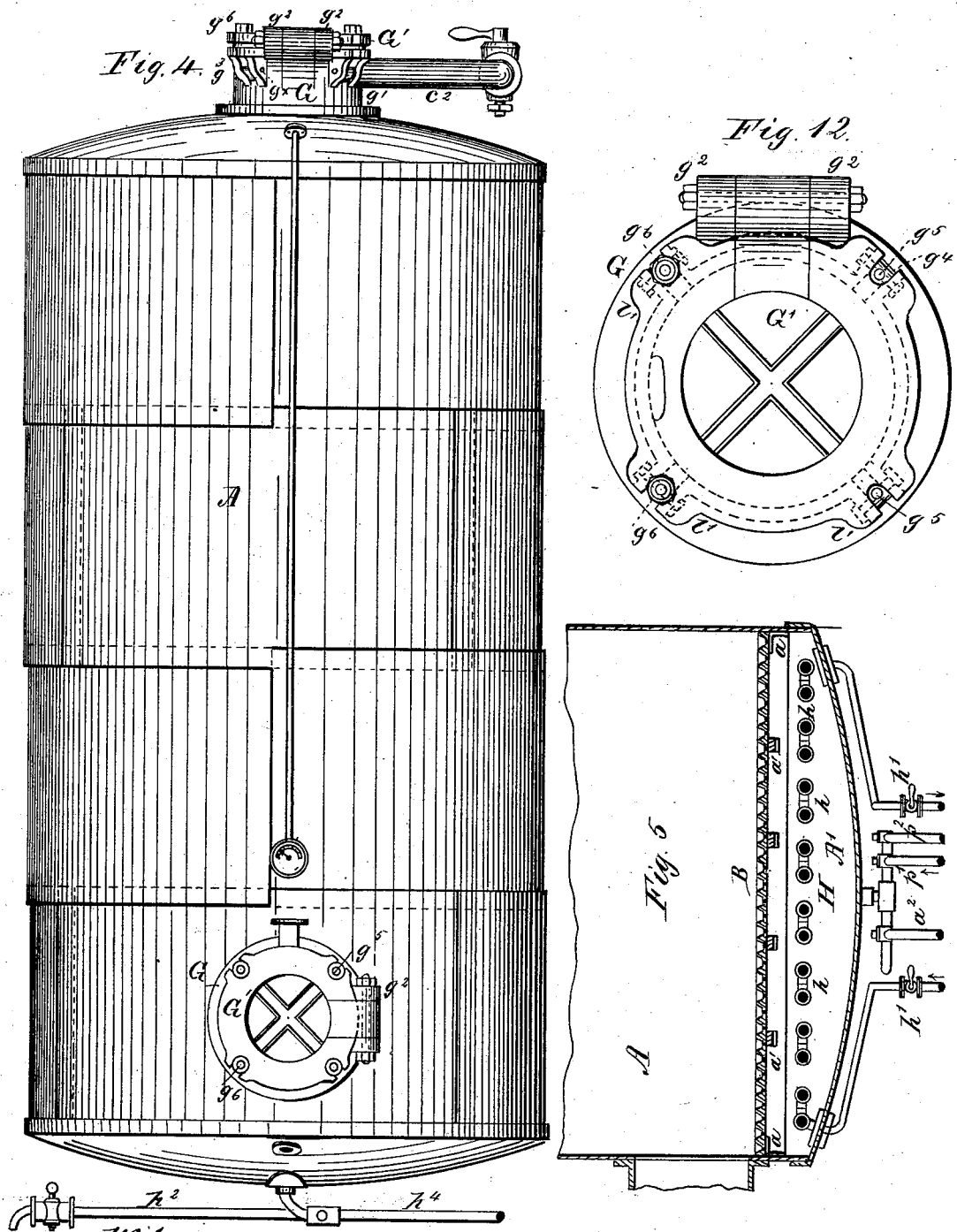

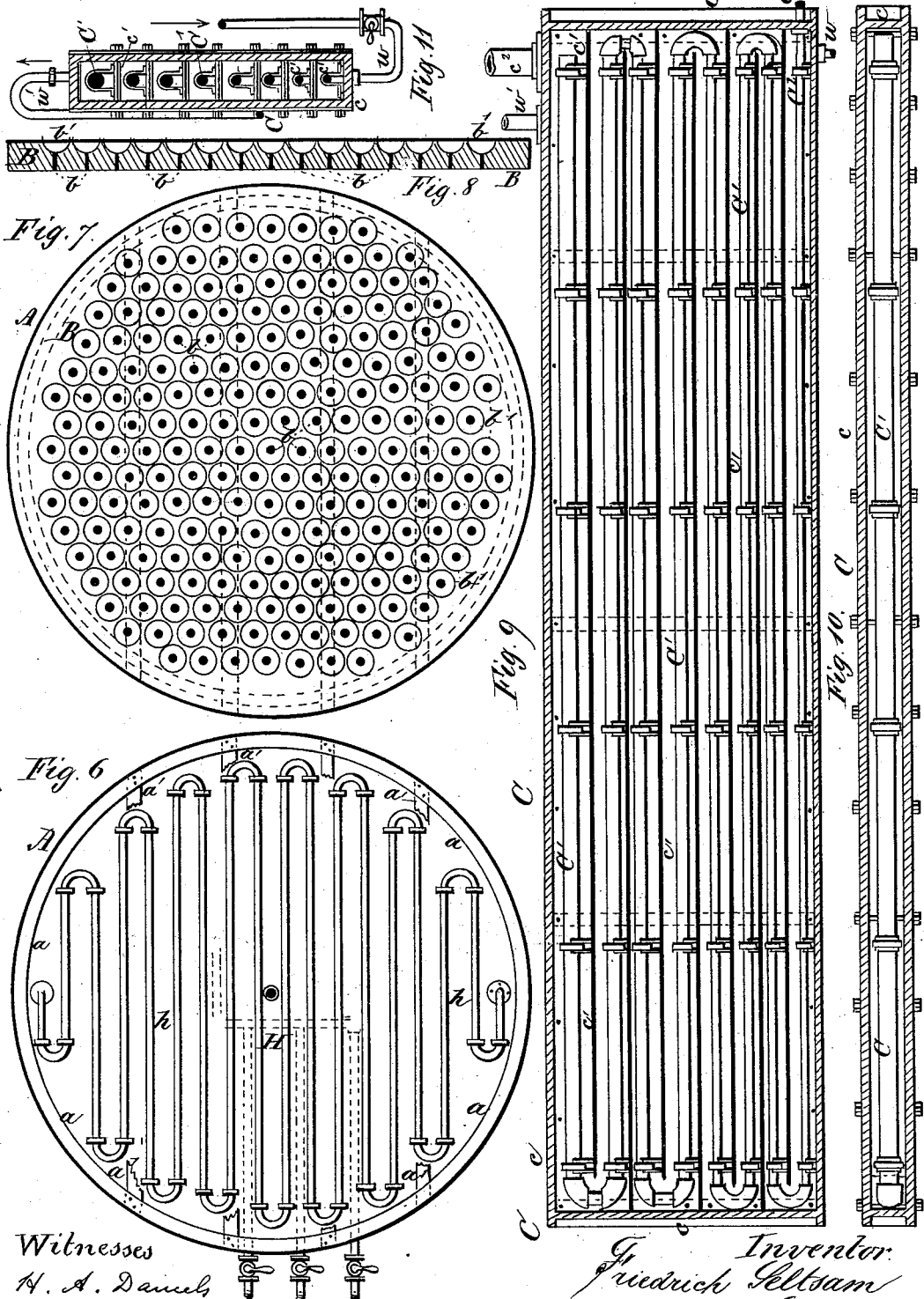

(No Model.) 7 Sheets—Sheet 6.
F. SELTSAM.
METHOD OF AND APPARATUS FOR SEPARATING AND RECOVERING THE FATTY MATTERS FROM BONES.
No. 261,634. Patented July 25, 1882.
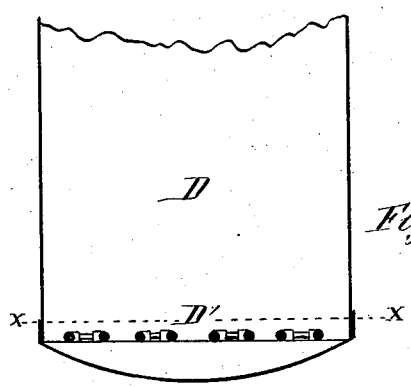
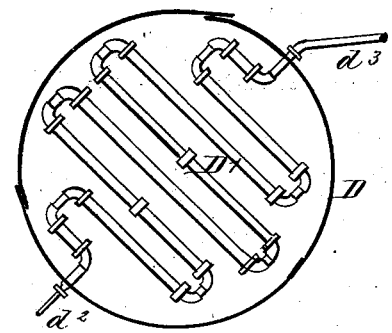
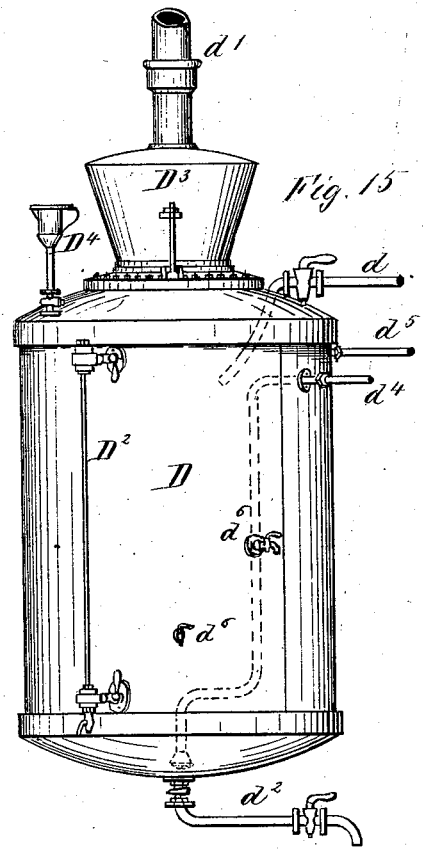
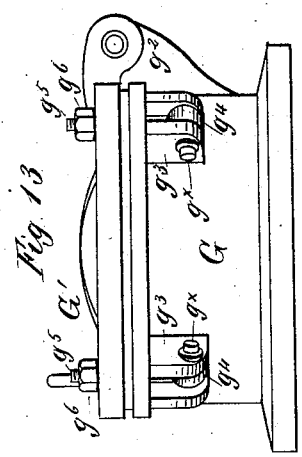
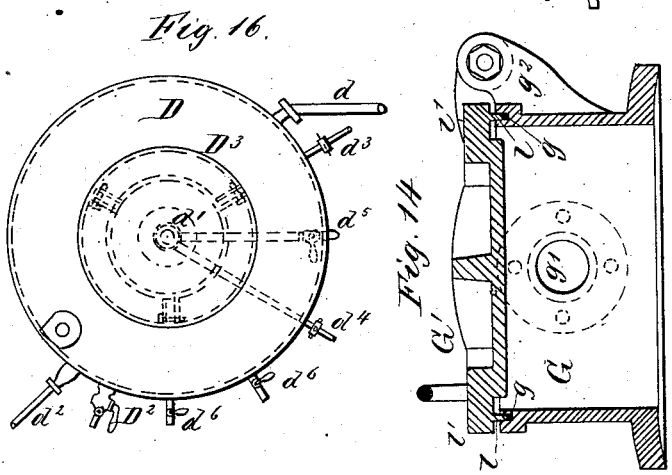
Witnesses
H. A. Daniels
Wm A. McElwee
Inventor
Friedrich Seltsam (No Model.) 7 Sheets—Sheet 7.
F. SELTSAM.
METHOD OF AND APPARATUS FOR SEPARATING AND RECOVERING THE FATTY MATTERS FROM BONES.
No. 261,634. Patented July 25, 1882.
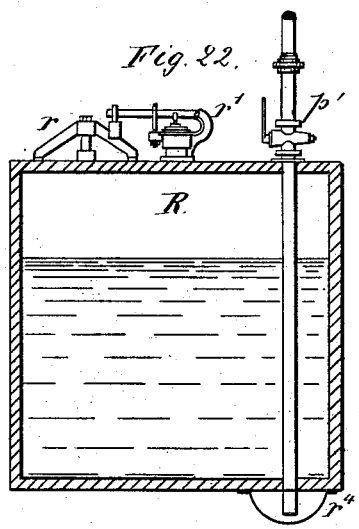
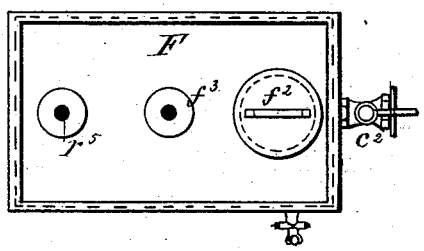
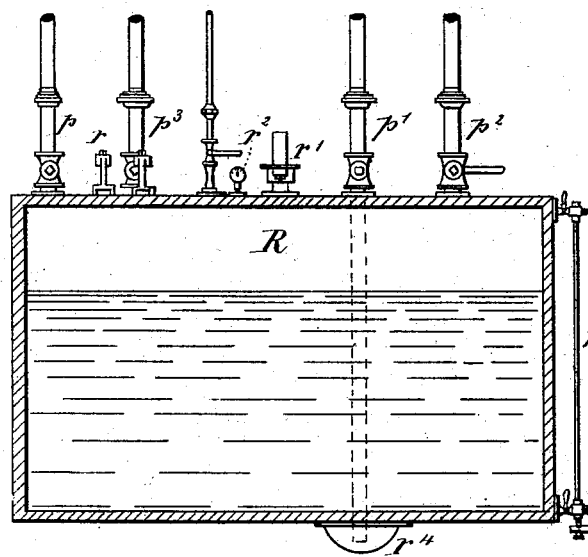
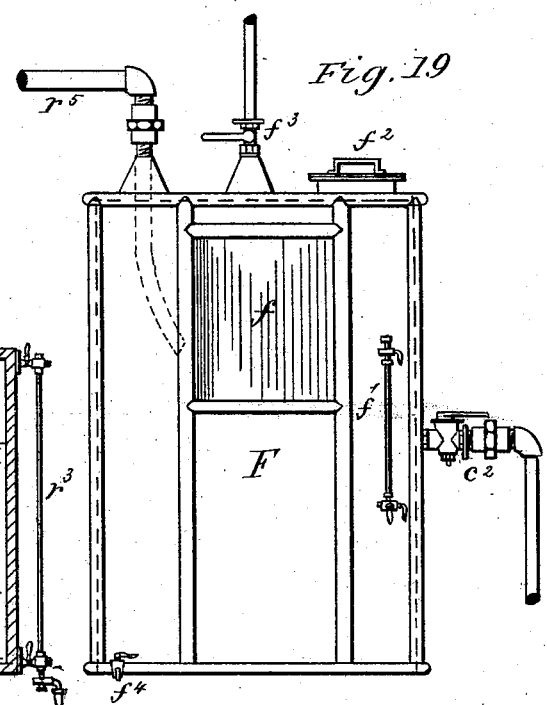
Witnesses.
H. A. Daniels
Wm. A. McElwee.
Inventor
Friedrich Seltsam
pr Henry Orth
att'y

UNITED STATES PATENT OFFICE.

FRIEDRICH SELTSAM, OF FORCHHEIM, BAVARIA, GERMANY.

METHOD OF AND APPARATUS FOR SEPARATING AND RECOVERING THE FATTY MATTERS FROM BONES.

SPECIFICATION forming part of Letters Patent No. 261,634, dated July 25, 1882.

Application filed July 28, 1881. (No model.) Patented in Belgium May 18, 1880, No. 51,484, and July 11, 1881, No. 55,141; in France May 19, 1880, No. 136,750, addition July 12, 1881, and in England July 7, 1881, No. 2,976.

*To all whom it may concern:*

Be it known that I, FRIEDRICH SELTSAM, a subject of the King of Bavaria, residing at the city of Forchheim, in the Kingdom of Bavaria and Empire of Germany, have invented certain new and useful Improvements in the Method of and Apparatus for Separating and Recovering the Fatty Matters from Bones; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to improvements in the art of extracting the fat from bones—a process which, up to the present time, has been but imperfectly carried out.

The oldest known method of extracting fat from bones consists in boiling the latter in water, which process was afterward superseded by treatment with superheated steam, which, however, proved to be disadvantageous in many particulars. Attempts were then made to extract the fat by means of solvents—such as sulphuret of carbon or liquid carbureted hydrogen—and in some places the extraction of fat from bones by this process was permanently established and carried out. This latter process has, however, this disadvantage: It requires large quantities of the solvent when employed in liquid form and made to act directly upon the bones.

Various attempts were also made to utilize the vapors of these solvents as they were evolved, and, finally, attempts were made to extract the fat from bones by means of these vapors under pressure, which, however, up to the present time, has not come into general use, owing to the dangerous nature of the solvents employed, which require precautionary measures that in practice have presented serious impediments.

My invention therefore consists essentially in the method hereinafter described of extracting fat from bones, and in a series of hermetically sealed or closed apparatuses arranged to form a circuit, by which the process of extracting the fat from bones by means of the vapors of sulphuret of carbon, benzine, ligroine, and analogous solvents under high pressure is carried out, and the solvent recovered by a continuous operation, and which shall be free from all danger, either to the health or security of the workmen.

In carrying out the process I proceed as follows: I employ a vertical or upright digester or extracting-vessel capable of being hermetically closed, and constructed to resist a pressure of from eight to ten atmospheres. The extracting-vessel has a perforated false bottom to support the charge, between which and the bottom of the digester a space is formed, wherein is located a heating apparatus. The digester is entirely filled with bones, and the solvent is preferably forced into the digester by means of an air-compressing pump that forces air into the solvent-reservoir, under the pressure of which the solvent is forced into the extracting-vessel, in which it is caused to rise, the solvent-reservoir, for purposes hereinafter more fully described, being located below the bottom of the said extracting-vessel.

In practice I employ an extracting-vessel that will hold about six tons of bones, for which quantity I use about one ton of benzine. The capacity of the vessel may of course be varied, if desired, and as a consequence the quantity of solvent is varied accordingly. Even the proportions of solvent above set forth may be varied, through I have found in practice that this proportion gives the best results.

The benzine, entering the extracting-vessel from below, rises therein to about one-fourth of its height and fills the interstices between the bones, as well as their pores, driving out the air before it, which escapes through the yet open charging-aperture.

When the required quantity of benzine has been forced into the vessel, which will be shown by a level-indicator, the communication with the benzine-reservoir is cut off and the operation of the compressing-pump stopped. Steam is now admitted to the coil below the charge of bones to heat and vaporize the benzine. Ordinary benzine will boil at a temperature of about 40° Celsius. I prefer, however, to employ benzine having a boiling-point of from 60° to 80° Celsius. The vapors generated drive out the remaining air from the digesting-vessel, and the charging-aperture is then hermetically closed.

The absence of air in the digesting-vessel may be readily ascertained by the escape of benzine vapors from the charging-aperture, though in practice, to avoid loss of such vapors, I do not resort to this means, but close the digesting-vessel after steam has been admitted thereto for a length of time sufficient to generate enough benzine vapor to drive out the air, the time required for this being soon ascertained by practice.

Inasmuch as it is impossible to drive out all the air from the digesting-vessel previous to closing the charging-aperture, and as the pipes that connect the upper end of said vessel with the condenser are also filled with air, I leave the communication between the digesting-vessel and condenser uninterrupted, so that the generated vapors may drive all the air out of said devices and their communicating pipes until fluid benzine escapes from the condenser into a receiver, when said communication is interrupted by closing a stop-cock or valve upon the communicating pipe. The confined vapors of benzine now increase in tension or pressure, said pressure, as observed by a manometer, being allowed to reach one and one-half atmosphere. This pressure may be varied, though in practice I have found it to be the most suitable, as the extraction of the fat is not so complete when a lower pressure is employed, while a higher pressure I have found to be superfluous, and, in fact, detrimental, as it tends to deteriorate the gelatinous components of the bones and seriously affect the value of the glue extracted therefrom by subsequent treatment.

When the above-mentioned pressure has been reached the steam is cut off and the extracting-vessel allowed to stand from six to seven hours. During this time a natural condensation of the benzine vapors takes place through the cooling action of the atmosphere, for which reason I avoid surrounding the same with a non-conducting jacket, which would be of advantage during the process of vaporization. On the other hand this condensation may be accelerated by allowing a spray of cold water to fall upon the extracting-vessel, yet I do not deem this advisable, as I have found in practice that it requires, as above stated, from six to seven hours to effect the complete extraction of the fat from the charge of bones. During this period of cooling and condensation the benzine-charged fat passes through the perforated false bottom into the space below the same, in which it is collected.

After the lapse of six or seven hours—that is, after complete cooling and condensation—steam is again admitted into the heating apparatus below the false bottom in the extracting-vessel until a pressure of about one-half atmosphere has been reached. This pressure is maintained until the distilling process is completed, and under which pressure it becomes possible to carry the generated vapors over to the condenser. Therefore as soon as the manometer indicates the above pressure communication is established between the extracting-vessel and the condenser, and the process of condensation carried on until the fluid escaping from the condenser shows but traces of benzine, when the steam is cut off from the heating apparatus within the extracting-vessel and the remaining solution forced into a special distilling apparatus. Steam is then admitted directly into the extracting-vessel, which carries off the last traces of benzine from the charge. The benzine-laden steam is carried through the condenser, and the liquefied benzine and steam are delivered into a receiver, wherein the benzine, owing to its specific gravity, will float on the water. This receiver is provided with a level-indicator, by means of which the level of both the water and benzine may be observed by the well-defined line of division produced by the clearness of the water and the slight turbidity of the benzine, which is drawn off and conducted to the reservoir, that for this reason is located below the condenser, receiver, and digesting-vessel, as above alluded to, while the water is run out of the receiver through a pipe at its bottom. This completes the process of extraction and the partial distillation of the benzine.

The fatty solution carried into the distilling apparatus yet contains about one-third of its volume in benzine, which is distilled off by boiling the solution in the still.

The benzine vapors evolved are carried into the condenser, and from thence to a receiver, and, finally, to the reservoir. When by observation it is found that but little benzine flows from the condenser steam is admitted to the still above the level of the fat, which steam escapes rapidly to the condenser, producing suction that tends to eliminate the benzine from the fat and accelerate the distillation. Lastly, in order to remove all traces of benzine steam is passed into the fat through a finely-perforated coil of piping, which produces a violent mechanical agitation, the steam carrying with it all the benzine not previously distilled or driven off.

In order that the process or method of operation may be better understood, I will describe the same in conjunction with my improved apparatus for carrying the same into practical effect, reference being had to the accompanying seven sheets of drawings, in which—

Figure 1, Sheet 1, is a plan view of a complete plant for carrying out the invention. Fig. 2, Sheet 2, is a side elevation, and Fig. 3, Sheet 3, an end elevation, of the same. Fig. 4, Sheet 4, is an elevation of the digesting-vessel. Fig. 5, same sheet, shows in vertical transverse section the lower part of said digesting-vessel. Figs. 6, 7, and 8, Sheet 5, show respectively horizontal transverse sections of the same, taken above and below the false bottom respectively, and a vertical transverse section of said false bottom. Figs. 9, 10, and 11, same sheet, show respectively a longitudinal vertical section, a like horizontal section, and a vertical transverse section of the condenser. Figs. 12, 13, and 14, Sheets 4 and 6, show respectively in plan view, side elevation, and vertical transverse section the construction of charging and discharging gates or apertures of the digesting-vessel. Figs. 15, 16, 17, and 18 illustrate the distilling apparatus by an elevation, a plan view, a partial vertical transverse section, and a horizontal section taken on line $x$ $x$ of Fig. 17, respectively. Figs. 19 and 20, Sheet 7, show the receiver or Woulfe's flask in elevation and plan respectively; and Figs. 21 and 22, same sheet, illustrate the solvent-reservoir by a longitudinal and a transverse vertical section, respectively.

All the detail drawings are illustrated on a larger scale, and like letters of reference are employed in all the figures of drawings to indicate like parts wherever such may occur.

The plant is composed of a digesting or extracting vessel, A, a distilling apparatus, D, a solvent-reservoir, R, a condenser, C, a water-reservoir, W, a compressing-pump, P, and a receiver for the products of distillation or Woulfe's flask, F, and their connections between each other, arranged substantially as shown in Figs. 1, 2, and 3, and as more fully described hereinafter.

For the digesting-vessel or extracting apparatus A, I preferably employ an upright cylinder capable of resisting a pressure equal to or greater than two and one-half atmospheres, though any other form of vessel may be employed, provided it is capable of resisting the stated pressure and of greater length than diameter to hold the charge of bones in the form of a column.

The vessel A has a dome shaped or convex top and bottom, the former having a charging-gate, and the latter a like discharging-gate, both capable of being hermetically sealed or closed, and which, as shown in Fig. 12, Sheet 4, and Figs. 13 and 14, Sheet 6, I construct as follows: G is the casing, provided in its upper face with an annular groove, $g$, an aperture, and pipe-coupling $g'$, to which the pipe $c^2$, leading to the condenser C, is coupled, and a projecting bearing, $g^2$, for a pivot-pin, upon which the lid G' swings. It is further provided with a series of bracket-bearings, $g^3$, for the reception of pivot-pins that pass each through an eye, $g^4$, secured or formed at right angles to the lower end of the bolt $g^5$, that at its upper end is threaded for the reception of a tightening-nut, $g^6$.

It will be seen that when constructed as described the bolts $g^5$ may be swung outward on their pivots $g^x$ for the purpose of disengaging them from the lid or gate G' by simply loosening the nuts sufficiently without unscrewing them entirely from the bolts.

The lid G' has an annular projecting flange, $l$, that fits snugly and fills, or nearly fills, the annular groove $g$ of the casing, within which groove is placed a packing of any suitable material, preferably hemp saturated with some fatty substance. Upon its periphery the lid is provided with a series of slotted projections, $l'$ $l'$, that serve to receive the bolts $g^5$.

It will be seen that when it is desired to open either the charging or discharging gate when closed, as shown, it will only be necessary to loosen the nuts $g^6$, swing the bolts $g^5$ outward and out of the slots of the lid, when the latter may be swung open upon its pivot, thus affording a rapid means of closure or opening for the gates, and at the same time a perfectly-tight joint between the gate and its casing.

Some distance from the bottom of the extracting-vessel A is located an annular-flanged bearing, $a$, to which are bolted a series of transverse braces, $a'$, that together support a false bottom, B, of copper or other suitable material, the upper face of which is on a level with the discharging-gate.

As shown in Fig. 5, Sheet 4, and in Figs. 7 and 8, Sheet 5, this false bottom B is composed of a series of perforations, $b$, that terminate in cups or cup-shaped cavities $b'$, formed or sunk in the upper face of said bottom to more readily collect the liquid products and conduct them to the chamber A' below said false bottom, within which chamber is located a heating apparatus, H, composed of a coil or series of connected pipe-sections, $h$, through which steam is passed for heating the contents of the vessel A.

The heating apparatus is connected with the steam-generator by pipe $h'$, and the steam escapes from said apparatus by pipe $h^2$, both pipes being provided with suitable stop-cocks, as shown in Fig. 5, Sheet 4.

The extracting-vessel A is further connected with the steam generator by a pipe, $a^2$, for the purpose of admitting steam directly to the contents of said vessel for purposes hereinbefore described.

The benzine-reservoir R (shown in detail, Figs. 21 and 22, Sheet 7) may be of any suitable shape and material. It is provided with a man-hole, $r$, a safety-valve, $r'$, a manometer, $r^2$, and a level-indicator, $r^3$.

The reservoir R is connected with the compressing-pump by pipe $p$, with the extracting-vessel by pipe $p'$, that conducts the benzine thereto, and by a return-pipe, $p^2$, for the benzine from the said vessel, and, finally, by a pipe, $p^3$, and the receiver or Woulfe's flask said reservoir is connected with the condenser C, all of which pipes are provided with suitable valves or stop cocks.

Through pipe $p$ the air compressed by pump P is admitted to the reservoir, by means of which the benzine is forced through the feed-pipe $p'$ into the chamber A' of the extracting-vessel A, said pipe $p'$ passing down into a chamber, $r^4$, formed at the bottom of the reservoir R, as shown, so that all the solvent in the latter may be driven out into the extracting-vessel.

The condenser C (shown in detail, Figs. 9, 10, and 11, Sheet 5,) is composed of a wooden box, c, containing a series of connected pipes, C', the inside diameter of which gradually increases from the bottom to the top of the condenser, as shown, each section of pipe being separated by a partition, c', so arranged that the water from the water-reservoir W, located on a higher level than the condenser, and admitted thereto by pipe w at one end into the bottom thereof, is compelled to circulate around each section of pipe alternately from one end of the condenser to the other, and passes out at top through pipe w', from which it is discharged.

The vapors to be condensed pass from the extracting-vessel A through pipes $c^2$ into the pipes C', wherein they are condensed, and the mixed products of condensation—benzine and water, the latter resulting from the moisture of the bones—pass out of the pipes C' at their smaller end, $C^2$, through a connecting-pipe, $c^3$, into a receiver or Woulfe's flask, F. (Shown in detail, Figs. 19 and 20, Sheet 7.) This receiver is composed of a hermetically-closed vessel of any desired shape, and preferably made of sheet metal. It is provided with an aperture closed by a pane of glass, $f$, through which the influx of the products of condensation may be observed. It is further provided with an air-escape adapted to be hermetically sealed or closed by a cover, $f^2$, the object of which is to provide a means for the escape of the air that is driven out of the extracting-vessel A by the benzine vapors at the early stage of the operation, which air passes from said vessel A to the condenser, thence to the receiver F, and out of said receiver into the atmosphere, and for a like purpose I also employ the pipe $f^3$, provided with a valve or stop-cock.

A level-indicator, $f'$, serves to observe the level of the condensed water and supernatant benzine.

The water is drawn off by a pipe, $f^4$, at the bottom of the receiver, and the benzine passes into the reservoir R through pipe $r^5$, both pipes being provided with suitable stop-cocks.

The distilling apparatus D (shown in detail, Figs. 15, 16, 17, and 18, Sheet 6) is connected with the extracting-vessel A by pipe d, with the condenser by pipe d', with the steam-generator by pipe $d^2$, to admit steam to the heating-pipes D', located in the bottom of the still, said steam escaping by pipe $d^3$ for the purpose of heating the combined fat and benzine brought to the still from the extracting-vessel A through pipe d, and whereby the benzine is distilled off.

The still is so constructed as to withstand a certain pressure, and may be of any desired form. It is provided with a level-indicator, $D^2$, the purposes of which are obvious.

The benzine vapors pass from the still to the condenser by pipe d', and are there condensed and conducted to the reservoir R in a manner similar to that described in relation to the benzine vapors carried direct from the extracting-vessel to the condenser.

Steam is admitted directly into the still D by pipe $d^4$, terminating in a rose-head, to effect a mechanical agitation of the fat and assist in the vaporizing of the benzine. $d^5$ is a pipe through which steam is admitted to the still above the level of the fat. Said steam escapes with the benzine vapors to the condenser, the object of which is to create a vacuum or suction by which the elimination of the last traces of benzine from the fat is assisted.

The still is surmounted by a cap or dome, $D^3$, for the purpose of collecting the benzine vapors, directing them to pipe d', and also preventing any fat from being carried over to the condenser by the benzine in case of the foaming of the latter during the process of distillation.

$D^4$ is a funnel that serves to return the samples of fat taken from the still for examination, for which purpose said still is provided with suitable stop cocks, $d^6$, at different levels.

Having fully described my invention, what I claim, and desire to secure by Letters Patent, is—

1. In the art of extracting fat from bones, the process hereinbefore described, which consists in forcing a solvent—such as benzine or its equivalent—into a charge of bones by means of compressed air, expelling the air from said charge by means of the tension of the solvent vapors, isolating said charge from contact with atmospheric air, increasing the tension of the solvent vapors to permeate the charge and dissolve out the fat, and removing the solution of the fat and solvent by means of the tension of said vapors, substantially as described.

2. In the art of extracting fat from bones, the process hereinbefore described, which consists in introducing into the charged, but open, extracting-vessel, a solvent—such as benzine or its equivalent—heating said solvent to generate vapors to expel the air from said vessel and its charge, closing said vessel hermetically, and increasing the tension of the vapors, as specified, and allowing the same to cool slowly, and when cooled again increasing the tension of the vapors to about one-half atmosphere, for the purposes set forth, and, finally, expelling the benzine-charged fat into a distilling apparatus, substantially as described, for the purpose specified.

3. The combination, with the digesting-vessel A, of the reservoir R and the level-indicator $r^3$, the pump P, and the connecting-pipes between the reservoir, pump, and digesting vessel, whereby a charge of solvent may be forced into said vessel by means of compressed air, and whereby the quantity of solvent charged is indicated, substantially as and for the purpose specified.

4. The combination, with the condenser C, of the Woulfe's flask or receiver F, having the air-escapes $f^2 f^3$ and the level-indicator $f'$, of the inlet-pipe $c^2$, the outlet-pipe for the benzine, $r^5$, and the stop-cock $f^4$, and the reservoir R, and their connecting-pipes, all arranged and constructed for operation substantially as and for the purpose specified.

5. The apparatus hereinbefore described, which consists of an extracting-vessel, A, a condenser, C, a receiver, F, a still, D, and pump P, in combination with a solvent-reservoir located below the extracting-vessel, condenser, and receiver, and a water-reservoir located above said devices, substantially as and for the purposes specified.

6. The apparatus hereinbefore described, which consists of an extracting-vessel, A, a condenser, C, a receiver, F, a still, D, a solvent-reservoir, R, and a water-reservoir, W, and a compressing-pump, in combination with the system of connecting-pipes, as shown and described, whereby said devices are made to form an uninterrupted and air-tight circuit, and whereby any one or more of said devices may be cut out of said circuit, substantially as described, for the purposes specified.

7. The condenser C, composed of a series of connected pipes, increasing in diameter from one end of the series to the other, in combination with an inclosing-case and partitions $c'$, interposed between the pipe-sections and arranged to conduct the cooling agent alternately from one end to the other of said pipe-sections, substantially as and for the purposes specified.

8. The receiver F, constructed substantially as described, and provided with a glass face, $f$, and the leveling-indicator $f'$, for the purposes specified.

In testimony whereof I affix my signature in presence of two witnesses.

FRIEDRICH SELTSAM.

Witnesses:
G. HENRY HORSTMANN,
FRIEDRICH TILLERMANN.